(12) United States Patent
Suzuki et al.

(10) Patent No.: US 7,105,246 B2
(45) Date of Patent: *Sep. 12, 2006

(54) CATALYTIC MATERIAL, ELECTRODE, AND FUEL CELL USING THE SAME

(75) Inventors: Shuichi Suzuki, Hitachi (JP); Chahn Lee, Hitachinaka (JP); Yuichi Satsu, Hitachi (JP); Kishio Hidaka, Hitachiota (JP); Mitsuo Hayashibara, Hitachinaka (JP); Yoshiyuki Takamori, Hitachinaka (JP); Tomoichi Kamo, Naka (JP); Yasuhisa Aono, Hitachi (JP)

(73) Assignee: Hiatchi Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/062,597

(22) Filed: Feb. 22, 2005

(65) Prior Publication Data

US 2005/0142429 A1 Jun. 30, 2005

Related U.S. Application Data

(62) Division of application No. 10/733,385, filed on Dec. 12, 2003.

(30) Foreign Application Priority Data

Dec. 12, 2002 (JP) .............................. 2002-360100

(51) Int. Cl.
*H01M 4/96* (2006.01)

(52) U.S. Cl. ......................................... 429/40; 429/44
(58) Field of Classification Search .................. 429/40, 429/44, 41; 502/180, 185; 501/180, 185

See application file for complete search history.

(56) References Cited

U.S. PATENT DOCUMENTS

| 6,380,126 | B1 * | 4/2002 | Finkelshtain et al. ....... 502/159 |
| 2002/0127440 | A1 * | 9/2002 | Yamamoto et al. ............ 429/2 |

FOREIGN PATENT DOCUMENTS

JP    2000-001306    1/2000

OTHER PUBLICATIONS

M. Yudasaka, et al., "Nitrogen-Containing Carbon Nanotube Growth From Ni Phthalocyanine By Chemical Vapor Deposition", Carbon, vol. 35, No. 2, pp. 195-201, 1997.
M. Terrones, et al., "Efficient route to large arrays of CNx nanofibers by pyrolysis of ferrocene/melamine mixtures", Applied Physics Letters, vol. 75, No. 25, pp. 3932-3934, 1999.
K. Suenaga, et al., "Carbon nitride nantubulite—densely-packed and well-aligned tubular nanostructures". Chemical Physics Letters 300, pp. 695-700, 1999.

* cited by examiner

*Primary Examiner*—Gregg Cantelmo
(74) *Attorney, Agent, or Firm*—Antonelli, Terry, Stout and Kraus, LLP.

(57) ABSTRACT

A catalytic material and electrode of the present invention are characterized in that the catalyst carrier constituting the above-mentioned catalytic material and electrode includes at least one member selected from the group consisting of nitrogen atoms, oxygen atoms, phosphor atoms, and sulfur atoms. Since the cohesion or growth of catalyst grains can hereby be suppressed, it is possible to provide a highly active catalyst, a high-performance electrode, and a high-output-density fuel cell which uses the same.

3 Claims, 5 Drawing Sheets

EMBODIMENT 3      COMPARATIVE EXAMPLE 2

US 7,105,246 B2

CATALYTIC MATERIAL, ELECTRODE, AND FUEL CELL USING THE SAME

This application is a Divisional application of prior application Ser. No. 10/733,385, filed Dec. 12, 2003, the contents of which are incorporated herein by reference in their entirety.

BACKGROUND OF THE INVENTION

1. Field of the Invention

The present invention relates to a catalytic material, electrode, and a fuel cell using the Same.

2. Related Art

The problems of global warming and environmental pollution due to massive consumption of fossil fuels are becoming critical problems in recent years. Fuel cells powered by hydrogen as countermeasures against these problems, including solid-state polymer electrolyte fuel cells (PEFCs), are now catching attention in lieu of the internal-combustion engines that each burn a fossil fuel. Also, information terminal equipment and the like are dimensionally reduced each year by the progress of electronic technology, and hereby, the rapid proliferation of hand-held electronic equipment is being accelerated. Currently, direct methanol fuel cells (DMFCs) fueled by methanol are under development as the next generation of power supplies for compensating for increases in the volumes of information handled by hand-held electronic equipment, and for the increases in power consumption that are associated with higher-speed information processing.

The catalytic materials used for the electrodes and other components of these fuel cells generally take a configuration in which catalysts are dispersed on catalyst carriers, as disclosed in Japanese Application Patent Laid-open Publication No. 2002-83604. Also, catalyst carriers use carbon materials.

SUMMARY OF THE INVENTION:

The activity of catalytic materials greatly depends on the particle sizes of the catalytic components included in the catalytic material. Decreases in the particle size of the catalytic component correspondingly increase the specific surface area (surface area of the catalytic component particles/weight of the catalytic component particles) of that catalytic component. When identical amounts of catalytic components are used, the activity of the catalyst is enhanced since its active area increases.

In conventional catalytic materials, however, since the respective catalytic components are supported on catalyst carriers mainly by physical adsorption, the particles of these catalytic components cohere or grow during the preparation of the catalytic materials and under the operating environments of cells. Consequently, the particles of the catalytic component increase in size to decrease in specific surface area. Such cohesion or growth of catalyst grains has made it difficult to prepare catalytic components with a small particle size, or to maintain the particle size of the catalytic component under the operating environment of the cell at a small value.

An object of the present invention is to provide a catalytic material, an electrode, and a fuel cell using the same. The fuel cell outputs an improved density by using the electrode that comprises the catalytic component with a large specific surface area and a small particle size.

The "catalytic components" here refer to a metal or metallic compound that has catalytic activity, and the "catalyst carriers" are substances that support the aforementioned catalysts. Carbon black, carbon nano tubes, or other carbon materials are used in the case of catalyst carriers for fuel cells.

DETAILED DESCRIPTION OF THE INVENTION

A major feature of the invention pertaining to the present application is that in a catalytic material, which includes a catalyst carrier and a catalytic component, the catalyst carrier further includes atoms that can be covalent bonded to the catalytic component. Here, "covalent bond" includes "coordinate bond".

Also, the catalyst carrier, if composed mainly of carbon, is preferred as a catalytic material for a fuel cell.

Structurally, the "carbon" here includes various substances from amorphous types to crystalline types such as graphite.

The "catalyst carrier further includes atoms that can be bonded by covalent bonds" means that atoms which can be bonded by covalent bonds to the catalytic component exist in the catalyst carrier by chemically bonding to the atoms (for example, carbon atoms) that constitute the catalyst carrier. If the atoms constituting the catalyst carrier are carbon atoms, however, the crystal particle size of the carbon crystal can be either large or small or the carbon can be amorphous. Or the atoms that can be bonded by covalent bonds may be covalent bonded to carbon atoms while at the same time being covalent bonded to hydrogen atoms.

A fuel cell with high output density can be provided by using, for a fuel cell, the catalytic materials of the present invention.

PREFERRED EMBODIMENTS OF THE INVENTION

Although the methods of preparing a catalytic material, described below, apply to DMFC, the application of the catalytic materials pertaining to the preferred embodiments of the present invention is not limited to DMFC; any types of catalytic materials can be applied, provided that they take a configuration in which a catalyst is dispersed on a catalyst carrier composed mainly of carbon atoms.

The "catalytic materials" in these preferred embodiments mean materials having a catalytic component supported by a catalyst carrier.

Embodiment 1

A method of preparing the catalytic material and electrode pertaining to the present embodiment is described below.

In the present embodiment, nitrogen atoms are used as the atoms that can be bonded by covalent bonds to a catalytic component.

Three and a half grams of carbon black containing 5-atomic-percent nitrogen, an alkaline solution, and a reducing agent are encased in a container and then mixed for 30 minutes by being stirred using a stirrer. Here, for example, a potassium hydroxide solution, a sodium hydroxide solution, aqueous ammonia, or the like can be used as the alkaline solution. Similarly, sodium borohydride, formalin, or the like can be used as the reducing agent. In the present embodiment, a potassium hydroxide solution and formalin are used as the alkaline solution and the reducing agent, respectively. A solution of a solution of a catalytic component is added to the mixture including these substances, and after the container has been maintained at a temperature of 40° C. using a water bath, the contents of the container are further stirred for one hour using a stirrer. For example, a chloride can be used as the salt of the catalytic component, and in the present embodiment, 2.1 grams of chloroplatinic acid is used. The solution, after being stirred, is filtered using a glass filter. Next, pure water is added to the thus-obtained substance, and after cleaning and filtering operations have been repeated seven times, the substance that has been finally obtained is dried in a constant-temperature oven at 80° C. for two days. After being dried, the substance is crushed in a mortar, and hereby, 4.5 grams of catalytic material with platinum supported on the carbon that includes nitrogen atoms is obtained. This material can likewise be prepared by using, for example, the alcohol reduction method, instead of the method in the present embodiment.

A mixture consisting of the obtained 1.0 gram of catalytic material, 0.6 grams of perfluorocarbon sulfonic acid, which is a proton conductive material, and slurry of a water/alcohol (1/4) mixed solvent, is prepared and then an electrode is formed on carbon paper by use of screen printing.

Figure 1:
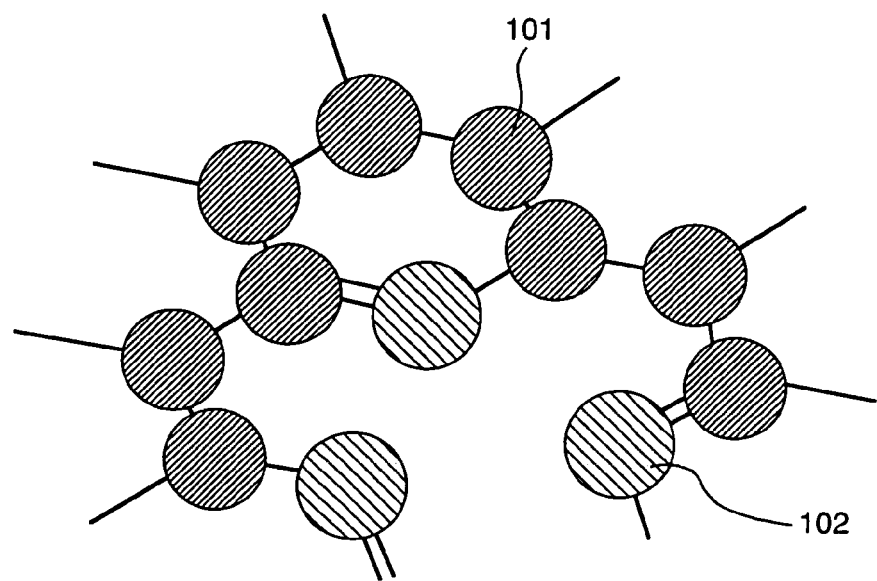
FIG. 1 is a schematic view of the carbon which includes the nitrogen pertaining to an embodiment.
Figure 2:
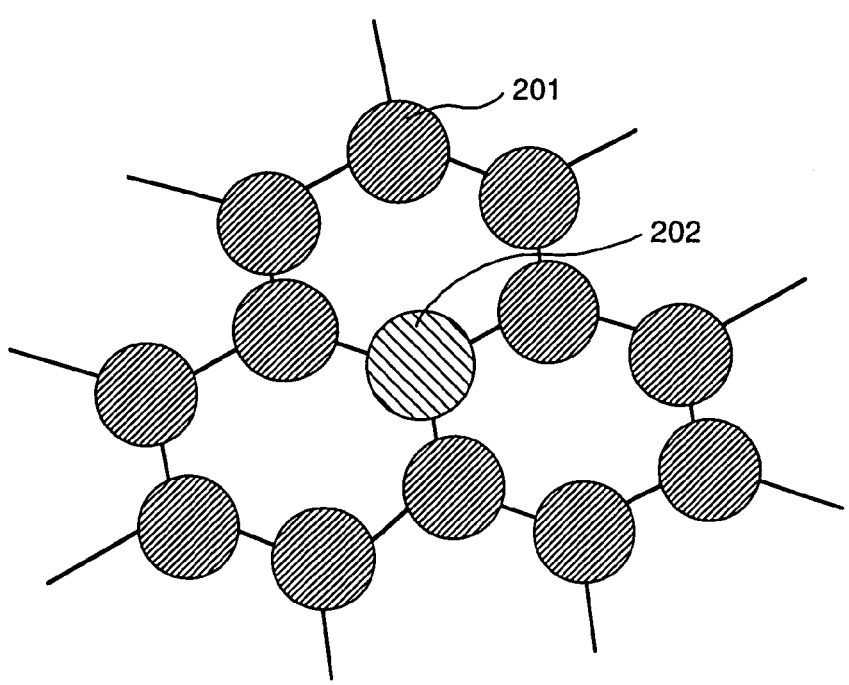
FIG. 2 is a schematic view of the carbon which includes the nitrogen pertaining to another embodiment.

Schematic views of a catalyst carrier pertaining to the present embodiment are shown in FIGS. 1 and 2. Some of the carbon atoms in carbon are replaced with nitrogen atoms mainly in the two forms of FIGS. 1 and 2. FIG. 1 represents a configuration in which carbon atoms 101 are replaced with nitrogen atoms 102 in the form of pyridine structure. FIG. 2 represents a configuration in which carbon atoms 201 are replaced with nitrogen atoms 202 in the form that six-membered-ring structure is maintained. When the crystal particle size is very small, however, since the bonds between the carbon atoms and the nitrogen atoms do not always take the configurations of FIG. 1 or 2 and since nitrogen atoms may be bonded to carbon atoms present in amorphous carbon or five-membered-rings may be formed, the present embodiment is not limited to these conformations.

Such a catalyst carrier with carbon and nitrogen, can be obtained by, for example, supplying a $C_2H_2/N_2$ gas mixture using the chemical vapor deposition (CVD) method. Or the catalyst carrier described above can likewise be obtained by a DC magnetron sputtering method that uses a graphite target under the atmosphere of an argon gas/nitrogen gas mixture. Or the catalyst carrier can likewise be obtained by heating an organic substance that contains a nitrogen gas, under an argon gas atmosphere.

Here, the bonds between the nitrogen atoms and the particles of the catalytic component are covalent bonds by which the particles of the catalytic component are stably supported on the surface of the carbon.

Therefore, under the status that the carbon that includes nitrogen atoms is used in the catalyst carrier, the particles of the catalytic component have their movements bound by the bonds with the nitrogen atoms. Thereby, the particles of the catalytic component can be prevented from cohering or growing during the preparation of the catalytic material and under the operating environment of the cell.

The advantage that the particles of the catalytic component can be prevented from cohering or growing is valid for both an anodic electrode and a cathodic electrode.

In the range that a fuel is sufficiently supplied to the dispersed particles of the catalytic component, it is desirable that the amount of catalytic component supported on the catalyst carrier should be as large as possible.

For the conventional carbon black used as a catalyst carrier, however, if the amount of support of the catalytic component is increased too significantly, the particles thereof cohere each other, thus reducing the effective area that is the catalyzing surface area of the catalytic component. For this reason, the maximum amount of support of the catalytic component has been about 50 weight percent (weight of the catalytic component/weight of the catalytic material).

However, since, as described above, the use of a catalyst carrier which includes nitrogen atoms causes the movements of the particles of the catalytic component to be bound by the covalent bonds with the nitrogen atoms, it is possible to prevent cohesion and to increase the amount of catalytic component supported.

For the catalytic material prepared in the present embodiment, portions of the catalytic component have the movements of their particles bound by covalent bonding to nitrogen atoms while maintaining a small particle size of about 2 nanometers with a certain probability.

Some of the particles of the catalytic component, however, still remain in the status that they can obtain thermal energy or the like and move about. Once these particles of the catalytic component have approached nitrogen atoms while moving about, the movements of those particles are bound by covalent bonds, or some of the particles of the catalytic component may have their movements bound in the neighborhood of nitrogen atoms after cohesion each other or becoming grown to a certain extent with a certain probability. It is considered that whether some of the particles of the catalytic component have their movements bound while maintaining a small particle size or have their movements bound after cohesion to a certain extent depends on the rate of dispersion of nitrogen atoms on the catalyst carrier or on the particle size of the particles of the catalytic component existing during the preparation of the catalytic material.

The fact that the particles of the catalytic component can be prevented from cohesion by having their movements bound offers the advantage that the distance between the particles of the catalytic component can be reduced below the distance obtained using conventional technology. That is to say, even at the conventional distance that makes the particles of a catalytic component too close to each other and thus coheres each particle, the use of the catalytic material described in the present embodiment prevents the cohesion between the adjacent particles of the catalytic component since the movements of the particles thereof are bound. Therefore, compared with its conventional value, the amount of catalyst carrier can be reduced when the same amount of catalytic component is included in an electrode. The fact that the amount of catalyst carrier can be reduced means that given the same electrode area, the thickness of the electrode can be reduced and hereby that the diffusion of a fuel in the electrode, the conductivity of electrons, and the conductivity of protons can be improved. Since materials mobility resistance can thus be reduced, the output density of a membrane electrode assembly (hereinafter, called the MEA804) can be improved. Also, the output characteristics values of PEFC and DMFC can be improved by using an MEA higher in output density. In addition, downsizing is possible by fixing these output characteristics values.

The binding effect of nitrogen atoms with respect to the catalytic component is provided by the nitrogen atoms existing in the surface layer of the catalyst carrier. Here, the density of the nitrogen atoms on the surface is dictated by the target amount of catalytic component supported and the particle size thereof. For this reason, although the density is not limited to any specific value, it is preferable that in the X-ray photoelectron spectroscopic (XPS) density analysis of the nitrogen atoms on the surface of the catalyst carrier, the above density should range from about 0.1 to 30 atomic percent. This is because, if the density of the nitrogen atoms on the surface of the catalyst carrier is less than 0.1 atomic percent, the binding effect cannot be easily obtained when supporting a catalyst whose density exceeds 0.01 weight percent, the value practically required. Or if the above density is greater than 30 atomic percent, it becomes difficult for the nitrogen atoms to be stably included in the carbon black while maintaining graphite structure, and thereby, the catalyst carrier decreases in mechanical strength. Also, such stereographic structure as the structure of a diamond, is created and thus the rate of graphite-like structure decreases, with the result that electron conductivity decreases. Further preferable density is from 1 to 10 atomic percent.

Although carbon black is used in the present embodiment as the chief component of the catalyst carrier into which nitrogen atoms are to be included, since the carbon black consists of secondary particles which are a cohered assembly of primary particles ranging from about several ten to several hundred nanometers in diameter, since the surface of the carbon black is rough, and since its specific surface area is large, it is considered that the number of sites at which the catalyst can be supported, in other words, the number of nitrogen atoms present on the surface of the catalyst carrier in the present embodiment, is great and hereby that the amount of support of the catalytic component per unit volume can be increased.

Therefore, it is considered from the above description that the thickness of the electrode can, in turn, be reduced and hereby that the diffusion of a fuel and the electro-conductivity of electrons and protons can be enhanced. Also, costs can be minimized since, in general, carbon black is easy to produce.

In order to evaluate the electrode that has been created according to the present embodiment, an electrode that uses carbon not including nitrogen atoms, instead of the carbon that includes nitrogen atoms, has been created as comparative example 1 by using a method similar to that of embodiment 1.

The electrode of embodiment 1 and the electrode of comparative example 1 have been immersed in a methanol-containing electrolytic solution [1.5 M sulfuric acid (M short for "mol/l") and 20-weight-percent methanol]] and monopolar measurements (current/voltage measurements) have been conducted. Here, a saturated-calomel electrode has been used as a reference electrode, and a metallic plate has been used as its counter electrode.

As a result, with the electrode of embodiment 1, a current density about 1.2 times that of the case of the electrode shown in comparative example 1 has been obtained at the same potential, and it is thus considered that the electrode of embodiment 1 is higher in performance.

Embodiment 2

It is to be understood that the second embodiment described below is the same as the method of embodiment 1, except that a mixture, in which the density of a carbon nanotube (hereinafter, called "CNT") that includes 5-atomic-percent nitrogen atoms is 80 weight percent with respect to the density of 20-weight-percent carbon black which includes 5-atomic-percent nitrogen atoms, has been used.

When a plurality of CNTs are used, since each CNT has a plurality of contact points and comes into contact, the resistivity inside the electrode can be reduced.

Figure 3:
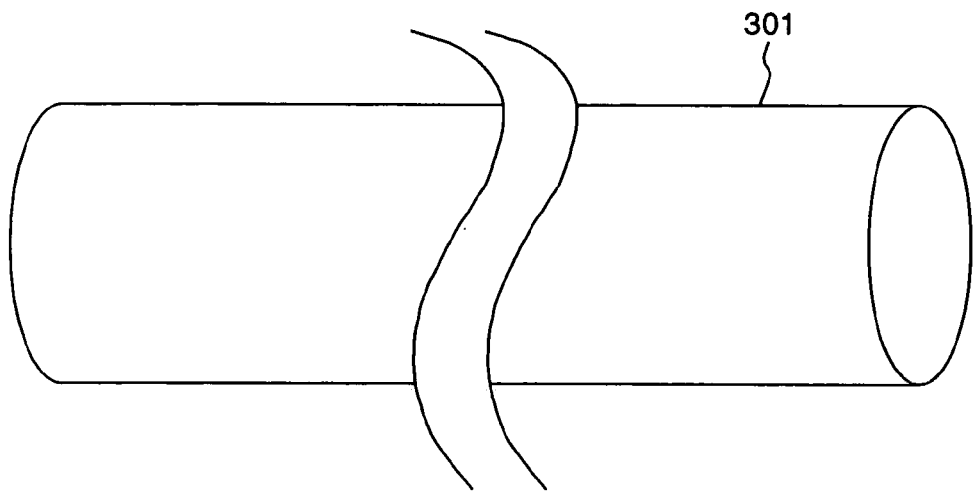
FIG. 3 is a schematic view of a single-wall carbon nanotube.
Figure 4:
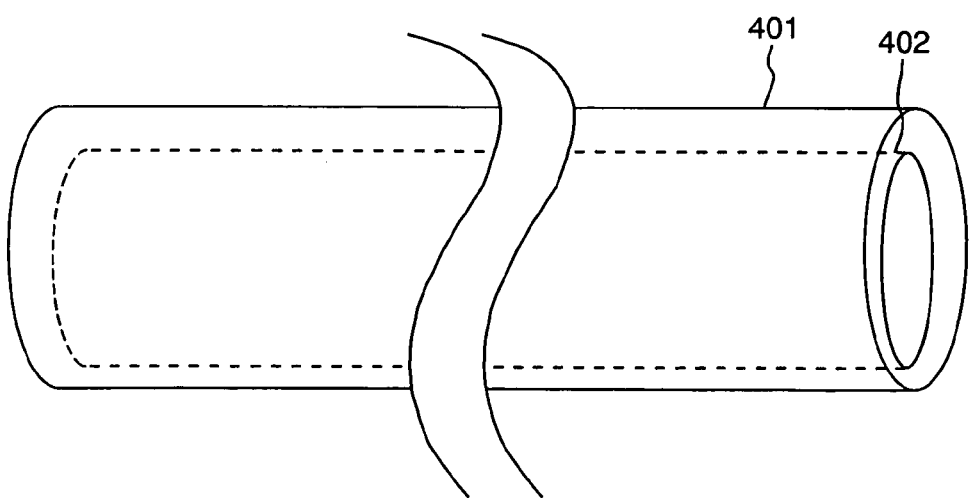
FIG. 4 is a schematic view of a multiple-wall carbon nanotube.

The CNTs pertaining to the present embodiment are shown in FIGS. 3 and 4. FIG. 3 shows a CNT having a cylindrical graphene sheet 301, and this type of CNT is called the single-wall carbon nanotube (SWCNT). FIG. 4 shows a CNT having an outer graphene sheet 401 and an inner graphene sheet 402 positioned inside the graphene sheet 401, and this type of CNT is called the multiple-wall carbon nanotube (MWCNT).

MWCNT, as its name implies, does not always have two walls and can has three or more walls.

Also, both SWCNT and MWCNT may be covered with a five-fold-ring semispherical cap, which is alias called the fullerene cap.

In addition, the graphene sheet, called the carbon nanofiber, may not be parallel with respect to the longitudinal direction of the tube, and this type of graphene sheet can be used alternatively.

Since, in general, SWCNT is large in specific surface area, it has the advantage that there are a number of sites at which the catalyst can be supported, whereas MWCNT has the advantages that it is high in electron conductivity, and hence, low in the loss of electron migration.

Figure 5:
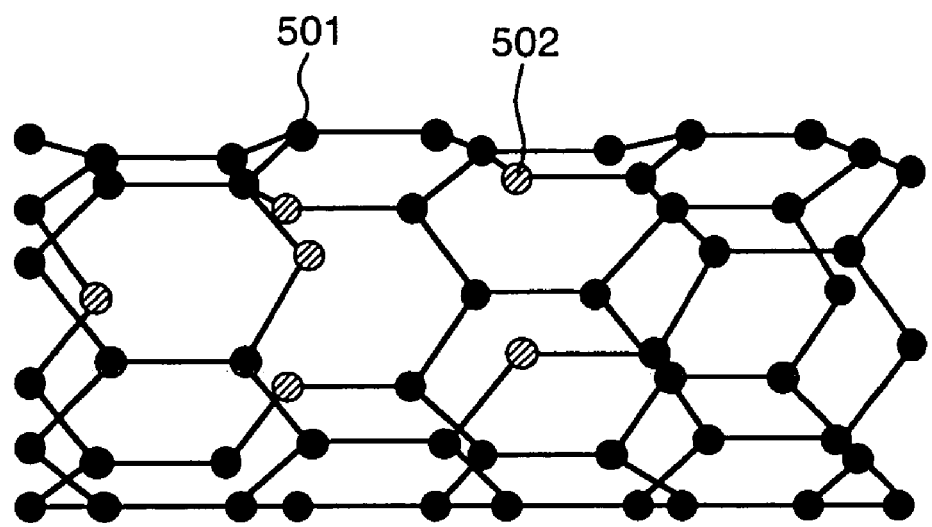
FIG. 5 is a schematic view of a carbon nanotube including the nitrogen pertaining to a yet another embodiment.

The CNT that includes nitrogen atoms pertaining to the present embodiment is shown in FIG. 5. Nitrogen atoms 502 are doped in such a conformation that they are replaced with the carbon atoms 501 constituting the CNT.

Figure 6:
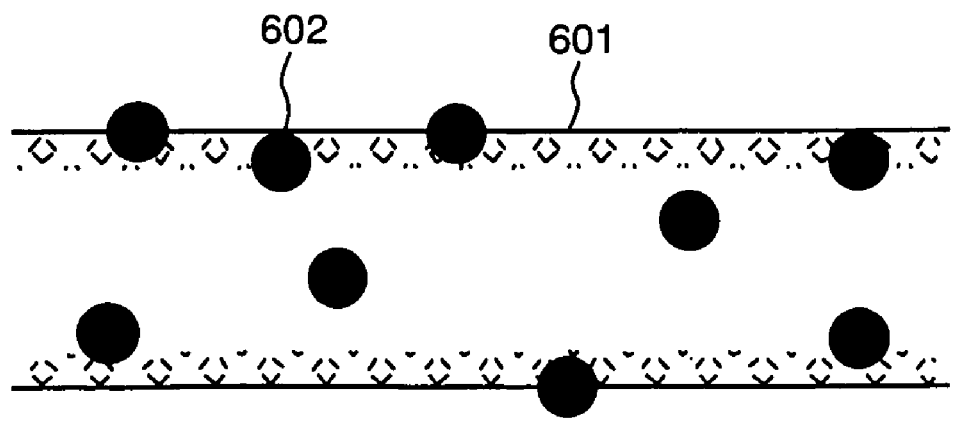
FIG. 6 is a schematic view of a catalytic material pertaining to a still another embodiment.

A schematic view of a catalytic material pertaining to the present embodiment is shown in FIG. 6. A catalytic component 602 is supported in particle form on a CNT 601 which includes nitrogen atoms. The catalytic component 602 is supported near the nitrogen atoms included in the nitrogen-containing CNT 601. At these locations, the movements of the particles in the catalytic component 602 are bound. Since the CNT 601 that includes nitrogen atoms is high in electron conductivity and has fiber structure, this CNT can become a good electron conduction path in an electrode. It is desirable that the catalytic component 602 be either a single metal selected from a group consisting of manganese, iron, cobalt, nickel, ruthenium, rhodium, palladium, rhenium, osmium, iridium, and platinum, or a compound composed of more than at least one type of metal selected from this group. The catalytic component 602 should be, further desirably, a material obtained by alloying these metals.

Platinum is preferable as the catalytic component to be used for the anode or cathode of a fuel cell. However, when carbon monoxide is present or when methanol is to be oxidized, higher performance can be achieved by using platinum and ruthenium in the catalytic component. Performance close to the desired performance can be provided by combining platinum, ruthenium, manganese, iron, cobalt, nickel, rhodium, palladium, rhenium, osmium, and iridium, instead of combining platinum and ruthenium.

In general, an alloy consisting of platinum and ruthenium is desirable as the catalytic component when it is to be used for an anodic electrode, and platinum is desirable when the catalytic component is to be used for a cathodic electrode.

Comparative example 1 and embodiment 2 have been compared using a method similar to that of embodiment 1. As a result, with the electrode of embodiment 2, a current density about 1.5 times that of the case of the electrode shown in comparative example 1 has been obtained at the same potential, and it is thus considered that the electrode of embodiment 2 is higher in performance.

Embodiment 3

A third embodiment is the same as comparative example 1, except that 2.1 grams of chloroplatinic acid and 1.1 grams of ruthenium chloride have been used as the salt of the catalytic component.

The electrode that has been used in comparative example 2 is the same as that of comparative example 1, except that 2.1 grams of chloroplatinic acid and 1.1 grams of ruthenium chloride have been used as the salt of the catalytic component.

Figure 9:
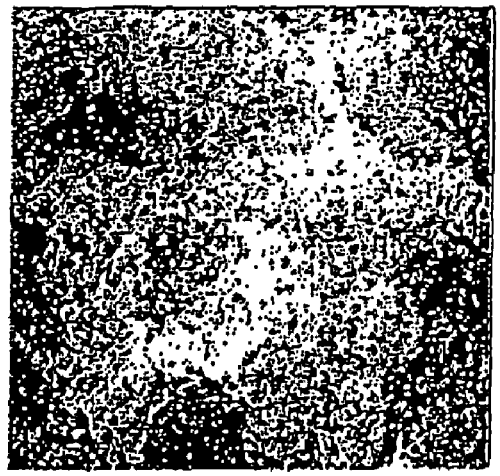
FIG. 9 shows a TEM photo of a catalytic material pertaining to a yet another embodiment.
Figure 9:

The results of observation of the catalytic material in embodiment 3 and the catalytic material in comparative example 2 by use of a transmission-type electron microscope are shown in FIG. 9. The average particle size of the catalytic component in comparative example 2 is about 5 nanometers, and the average particle size of the catalyst in embodiment 3 is about 2 nanometers. It can therefore be seen that the catalyst particles in embodiment 3 are supported in a more finely structured condition.

Monopolar measurements have been performed on the electrode of embodiment 3 and that of comparative example 3 by using a method similar to that of embodiment 1. As a result, with the electrode of embodiment 3, a current density about 3 times that of the case of the electrode shown in comparative example 2 has been obtained at the same potential, and it has thus been found that the electrode of embodiment 3 is higher in performance.

It has been seen, therefore, that combining platinum and ruthenium, instead of using platinum alone, is likewise effective for creating a catalytic component. An equal effect has also been obtained by combining platinum and manganese or combining platinum and iron or the like.

Also, there are various types of metals such as platinum, ruthenium, manganese, and iron. These metals range from a type present alone on a catalyst carrier, to a type present as an alloy. In addition, these metals can each be some type of compound. For example, they can be oxides or chlorides.

Embodiment 4

Figure 8:
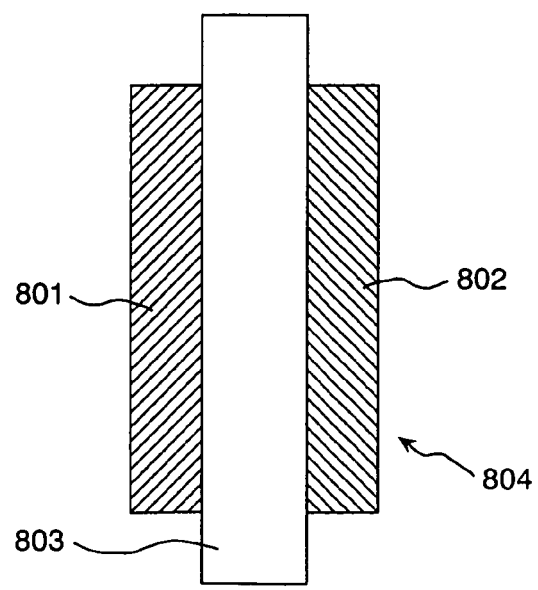
FIG. 8 is a cross-sectional schematic view of an MEA pertaining to a yet another embodiment.

A cross-sectional schematic view of the MEA804 pertaining to a fourth embodiment is shown in FIG. 8. Although, in FIG. 8, the thicknesses of electrodes and of an electrolyte membrane are depicted in enlarged form for the ease of understanding, the MEA actually created is of a sheet-like shape and has a thickness from about 70 to 500 microns (10 to 100 microns in electrode thickness and 50 to 300 microns in electrolyte membrane thickness), and the MEA pertaining to the present embodiment is 100 microns thick. The MEA pertaining to the present embodiment consists of an anodic electrode 801, a cathodic electrode 802, and an electrolyte membrane 803 which is positioned in between both electrodes. Next, a method of preparing the MEA804 pertaining to the present embodiment is described below.

The MEA804 is prepared by using the electrode of embodiment 3 as an anodic electrode, and the electrode of embodiment 1 as a cathodic electrode, then arranging both electrodes on both sides of, and adjacently to, a perfluorosulfonic acid membrane which is to be used as the electrolyte membrane 803, and thermally crimping and copying the thus-configured object by means of a hot press.

The method of preparing an MEA, described as comparative example 4 below, is same as that of embodiment 4, except that the electrode of comparative example 3 and the electrode of comparative example 1 are used as an anodic electrode and a cathodic electrode, respectively.

Figure 7:
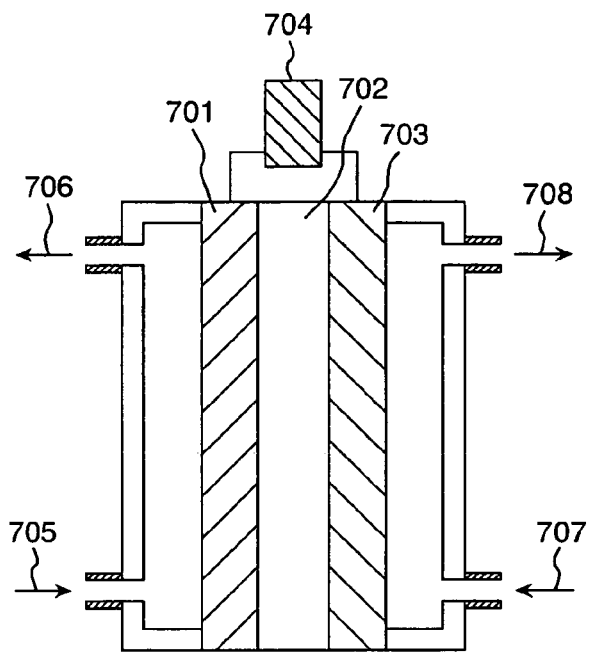
FIG. 7 is a schematic view of a direct methanol fuel cell using the electrodes pertaining to a still another embodiment.

A schematic view of the DMFC pertaining to the present embodiment is shown in FIG. 7. The foregoing DMFC consists mainly of an MEA which is further compose of an anodic electrode 701, a cathodic electrode 703, and a proton-conductive electrolyte membrane 702 positioned in between both electrodes. A fuel 705 composed mainly of methanol and water, is supplied to the anodic electrode 701, and carbon dioxide and water 706 are discharged therefrom. A gas 707 that contains air or oxygen, is supplied to the cathodic electrode 703, and an exhaust gas 708 that contains water and the unreacted gas within the introduced gas, is discharged. Also, the anodic electrode 701 and the cathodic electrode 703 are connected to an external circuit 704.

The MEA of the present embodiment and the MEA of comparative example 4 have been used in the DMFC of such configuration as described above, and both MEAs have been compared in output density. It is considered that compared with the output density of the DMFC which uses the MEA of comparative example 4, the output density of the DMFC using the MEA of the present embodiment is about two times.

Embodiment 5

Since the catalyst-binding effect of nitrogen atoms depends mainly on the nitrogen atoms existing on the surface of a catalyst carrier, an equal effect can be obtained by using, for a catalyst carrier, a substance structured so that the surface of carbon black is covered with the carbon which includes nitrogen atoms. In this case, since the shape of the catalyst carrier depends on the shape of the employed carbon black to a certain extent, there is the advantage that the final shape of the catalyst carrier can be selected by selecting the shape of the carbon black to be actually used.

A method of preparation is described below. Carbon black and hexamethoxymethyl melamine have been mixed at a weight ratio of 1:4 in ethanol for one hour and then this mixture has been dried in the atmosphere for 24 hours at 80° C. The thus-obtained object has been burned for one hour at 800° C. under an argon atmosphere, with the result that a catalyst carrier in which the surface of the carbon black is covered with the carbon which includes nitrogen atoms has been obtained.

The obtained catalyst carrier has been analyzed with XPS to find that the density content of the nitrogen atoms is 5 atomic percent. A catalytic material has been obtained using a method similar to embodiment 3, except that the above substance has been used instead of the carbon including 5-atomic-percent nitrogen.

The catalytic material in the present embodiment and the catalytic material in comparative example 2 have been observed using a transmission-type electron microscope to find that the average particle size of the catalytic component supported by the catalytic material which has been obtained in the present embodiment is about 2 nanometers, and this indicates that the catalytic component in the present embodiment is supported in a more finely structured particle condition.

Embodiment 6

A catalytic material with a catalyst supported on the carbon which includes nitrogen atoms can likewise be obtained by previously mixing the salt of the catalytic component and a precursor of the carbon which includes nitrogen atoms, and then burning the mixture. Zero-point-three grams of phenylene diamine, 0.7 grams of polyamic acid, 100 ml of N-methyl-2-pyrrolidinone, 0.2 grams of chloroplatinic acid, and 0.1 gram of ruthenium chloride are mixed and then stirred for one hour. The stirred mixture is then vacuum-dried for two hours at 200° C. The thus-obtained solid substance is burned at 800° C. for one hour under an argon atmosphere.

The catalytic material in embodiment 6 and the catalytic material in comparative example 2 have been observed using a transmission-type electron microscope to find that the particle sizes of the catalysts are almost the same (approximately 5 nanometers). It is considered, however, that the catalyst in embodiment 6 is dispersed more uniformly.

Embodiment 7

It is to be understood that the present embodiment is the same as embodiment 3, except that carbon containing 5 atomic % of sulfur that is capable of bonding to the catalytic component by covalent bond was used instead of carbon containing 5 atomic % of nitrogen.

The electrodes of the present embodiment and those of comparative example 6 are measured using a monopolar measuring method similar to that of embodiment 1. Here, a saturated-calomel electrode is used as a reference electrode, and a metallic plate is used as its counter electrode. As a result, with the electrodes of the present embodiment, current densities about 3 times those of the electrodes shown in comparative example 2 have been obtained at the same potential, and it is thus considered that the electrodes in the present embodiment are higher in performance.

The catalytic material in the present embodiment and the catalytic material in comparative example 2 have been observed using a transmission-type electron microscope to find that the particles of the catalyst in the present embodiment are supported in a more finely structured condition.

Embodiment 8

It is to be understood that this embodiment is the same as embodiment 7, except that a catalyst carrier which includes oxygen atoms in lieu of a catalyst carrier which includes sulfur atoms.

Single electrode measurements have been performed on the electrodes of the present embodiment and those of comparative example 2 by using a method similar to that of embodiment 1. As a result, with the electrodes of the present embodiment, current densities about 3 times those of the electrodes shown in comparative example 2 have been obtained at the same potential, and it has thus been found that the electrodes in the present embodiment are higher in performance. It has been seen, therefore, that using a catalyst carrier which includes oxygen atoms, instead of using a catalyst carrier which includes sulfur atoms, creates an equal effect. It is considered that an equal effect can also be obtained by using a catalyst carrier which includes phosphorus atoms.

What is claimed is:

1. A fuel cell comprising an anodic electrode for oxidizing a liquid fuel, a cathodic electrode for reducing oxygen, and an electrolyte membrane formed between said anodic electrode and said cathodic electrode; wherein at least one of said anodic electrode and the cathodic electrode has a catalytic material which contains a catalyst carrier containing carbon and a metal catalytic component, said catalyst carrier also containing at least one atom selected from the group consisting of nitrogen, sulfur, oxygen, and phosphorus atoms, wherein the carbon is selected from the group consisting of carbon black, graphite, carbon nanotubes and carbon nanofibers.

2. A fuel cell comprising an anodic electrode for oxidizing a liquid fuel, a cathodic electrode for reducing oxygen, and an electrolyte membrane formed between said anodic electrode and said cathodic electrode; wherein either said anodic electrode or cathodic electrode or both have a catalytic material comprising a metal catalytic component and a catalyst carrier for the metal catalytic component, and in which the catalyst carrier contains carbon and also contains atoms that have formed covalent bonds with said metal catalytic component, wherein the carbon is selected from the group consisting of carbon black, graphite, carbon nanotubes and carbon nanofibers.

3. A membrane/electrode assembly in which at least one of an anodic electrode for oxidizing a fuel and a cathodic electrode for reducing oxygen has a catalytic material comprising a metal catalytic component and a catalyst carrier for supporting said metal catalytic component, wherein the catalyst carrier contains carbon and also contains atoms that have formed covalent bonds with said metal catalytic component, and a proton-conductive material, and in which a proton-conductive electrolyte membrane is formed between said anodic electrode and said cathodic electrode, wherein the carbon is selected from the group consisting of carbon black, graphite, carbon nanotubes and carbon nanofibers.

* * * * *